United States Patent Office 3,470,110
Patented Sept. 30, 1969

3,470,110
POLYGLYCIDYL ETHERS OF POLYGLYCOLS
Alfred Renner, Muenchenstein, Switzerland, assignor to Ciba Limited, Basel, Switzerland, a company of Switzerland
No Drawing. Filed Aug. 15, 1967, Ser. No. 660,595
Claims priority, application Switzerland, Aug. 30, 1966, 12,568/66
Int. Cl. C08g 30/04; C07d 1/18
U.S. Cl. 260—2                               5 Claims

ABSTRACT OF THE DISCLOSURE

This invention relates to a polyepoxide of the formula

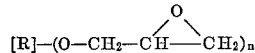

where R represents the residue, freed from the terminal hydroxyl groups, of a polyhexamethyleneglycol containing at least 2 hexamethyleneglycol units, which may additionally contain cocondensed units of other polyhydric alcohols, and $n$ is 2 or a higher number.

The polyglycidyl ethers may be cured by themselves to furnish elastic shaped articles.

---

It is known to flexibilize epoxy resins by adding long-chain compounds, especially polyethyleneglycol, polypropyleneglycol or polybutyleneglycol, as so-called flexibilizers. It has further been proposed to use the diglycidyl ethers of these polyglycols as flexibilizing epoxy resins which has at the same time the advantage that these long-chain compounds on curing are built into the molecule in a manner fast to migration and can, therefore, not volatilize on being heated. Crosslinked, long-chained diglycidyl ethers of polyethyleneglycol, of polypropyleneglycol and of polybutyleneglycol have, however, the shortcoming that they absorb relatively much water. Above all, on being reacted with the curing agents conventionally used in epoxy resin chemistry they do not give rise to shaped products having satisfactory strength properties. They must, therefore, be used in admixture with other epoxy resins, such as the epoxy resins based on bisphenol A and epichlorohydrin. Finally, when an adequate excess of other epoxy resins is used it is possible to manufacture useful shaped products, but the disadvantage of the increased sensitivity to moisture, caused by the hydrophilic polyether component, remains much in evidence.

The present invention is based on the unexpected finding that when polyhexamethyleneglycols are converted into their diglycidyl ethers epoxy resins are obtained which, when being cured and at the same time shaped, produce flexible shaped products having none of the disadvantages referred to above. The present invention provides new polyepoxides of the formula

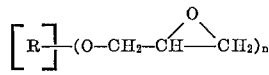

in which R represents the residue, freed from the terminal hydroxyl groups, of a polyhexamethyleneglycol containing at least 2 hexamethyleneglycol units, which may additionally contain fused-on units of other polyhydric alcohols, and $n$ is 2 or a higher number.

According to this invention the new diepoxides are manufactured by reacting an epihalohydrin, preferably epichlorohydrin, in the presence of a Lewis acid, with a polyglycol of the formula $R$—$(OH)_n$, in which R represents the residue, freed from the terminal hydroxyl groups, of a polyhexamethyleneglycol containing at least 2 hexamethyleneglycol units, which may additionally contain fused-on units of other polyhydric alcohols, and where $n$ is 2 or a higher number, and the resulting product containing halohydrin groups is treated in a second stage with an agent capable of splitting off hydrogen halides.

While a preferred starting material is a homo-polycondensate $R(OH)_n$ of hexamethyleneglycol, it may be advantageous for some applications to start from co-polycondensates from hexamethyleneglycol and other n-hydric alcohols, such as ethyleneglycol, neopentylglycol, glycerol, trimethylolpropane or pentaerythritol. The reaction of the polyhexyleneglycol with epichlorohydrin is carried out in the presence of a Lewis acid, such as tin tetrachloride, aluminium trichloride, zinc chloride, titanium tetrachloride or, above all, boron trifluoride or a boron trifluoride complex.

As agents capable of splitting off hydrogen halides there are generally used strong alkalies, such as anhydrous sodium hydroxide or aqueous sodium hydroxide solution, though other strongly alkaline reagents such as potassium hydroxide, barium hydroxide, calcium hydroxide, sodium carbonate or potassium carbonate are likewise suitable.

The polyglycidyl ethers obtained by the present process can be prepared from polyhexamethyleneglycols having a degree of polycondensation ranging from 2 to 100. The diglycidyl ethers of the polyhexamethyleneglycols having a medium degree of polycondensation from about 2 to 4 are mobile oils, whereas the higher members have a waxy character.

The polyglycidyl ethers manufactured according to this invention may be cured by themselves to furnish elastic shaped articles.

Whereas the polyglycidyl ethers manufactured by the present process may be used by themselves as epoxy resins, it is in some cases advantageous to cure mixtures that contain additionally other epoxy compounds.

As epoxy compounds that may be admixed the following examples may be mentioned:

Alicyclic polyepoxides such as vinylcyclohexene dioxide, limonen dioxide, dicyclopentadiene dioxide, ethyleneglycol - bis(3,4 - epoxy-tetrahydro-dicyclopentadien-8 - yl) - ether, (3,4 - epoxy-tetrahydro-dicyclopentadien-8-yl)-glycidyl ether, epoxidized polybutadienes or copolymers of butadiene with ethylenically unsaturated compounds such as styrene or vinylacetate; compounds containing two epoxy-cyclohexyl residues such as diethyleneglycol - bis(3,4 - epoxy-cyclohexanecarboxylate), bis-3,4-(epoxy-cyclohexylmethyl)-succinate, 3,4-epoxy-6-methylcyclohexylmethyl - 3,4 - epoxy - 6-methylcyclohexanecarboxylate and 3,4-epoxy-hexahydrobenzal-3,4-epoxy-cyclohexane-1,1-dimethanol.

Further suitable are polyglycidyl esters obtained by reacting a dicarboxylic acid or cyanuric acid with epichlorohydrin or dichlorohydrin in the presence of alkali. Such polyesters may be derived from aliphatic dicarboxylic acids such as succinic or adipic acid, from cycloaliphatic dicarboxylic acids such as tetra- or hexahydrophthalic acid, or from aromatic dicarboxylic acids such as phthalic or terephthalic acid. There may be mentioned, for example, diglycidyl adipate, diglycidyl hexahydrophthalate, diglycidyl phthalate and triglycidyl isocyanurate.

Furthermore, there may be used basic polyepoxy compounds obtained by reacting primary or secondary aliphatic or aromatic diamines, such as aniline, toluidine, 4,4'-diaminodiphenylmethane, 4,4'-di-(monomethylamino)-diphenylmethane or 4,4'-diaminodiphenylsulphone, with epichlorohydrin in the presence of alkali.

Preferred use is made of polyglycidyl ethers obtained by etherifying a dihydric or polyhydric alcohol or diphenol or polyphenol with epichlorohydrin or dichlorohydrin in the presence of alkali. These compounds may be derived from glycols, such as ethyleneglycol, diethyleneglycol, triethyleneglycol, 1,3-propyleneglycol, 1,4-butanediol, 1,5-pentanediol, 1,6-hexanediol, 2,4,6-hexanetriol, glycerol or especially from diphenols or polyphenols, such as resorcinol, pyrocatechol, hydroquinone, 1,4-dihydroxynaphthalene, phenol-formaldehyde condensation products of the type of the resoles or novolaks, bis(p-hydroxyphenyl)-methane, bis(p-hydroxyphenyl)methylphenylmethane, bis(p-hydroxyphenyl)tolylmethane, 4,4' - dihydrodiphenyl, bis(p-hydroxyphenyl)sulphone or especially from bis(p-hydroxyphenyl)dimethylmethane.

There may be especially mentioned the polyglycidyl ethers of bis(p-hydroxyphenyl)dimethylmethane [=bisphenol A] corresponding to average formula

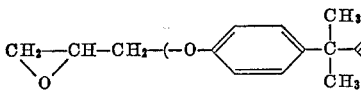 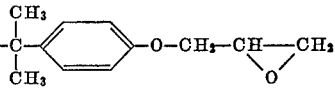

in which $z$ is a small whole or fractional number from 0 to 2.

Furthermore, there may be used mixtures of two or more of the epoxy resins mentioned above.

The polyepoxides of this invention react with the usual curing agents for epoxy compounds, so that by addition of such curing agents they can be crosslinked or cured like other polyfunctional epoxy compounds or epoxy resins. As such curing agents basic and especially acid compounds are suitable.

The following have proved suitable: Amines and amides, such as aliphatic and aromatic primary, secondary and tertiary amines, for example p-phenylenediamine, bis(p-aminophenyl) methane, ethylenediamine, N,N-diethylethylenediamine, diethylenetriamine, tetra(hydroxyethyl)diethylenetriamine, triethylenetetramine, N,N-dimethylpropylenediamine, Mannich's bases such as tris(dimethylaminomethyl)phenol; dicyandiaminde, urea-formaldehyde resins, melamine-formaldehyde resins, polyamides, for example those from aliphatic polyamines and dimerized or trimerized unsaturated fatty acids; polyhydric phenols, for example resorcinol, bis(4-hydroxyphenyl)dimethylmethane, phenol-formaldehyde resins, reaction products of aluminium alcoholates or phenolates with compounds of tautomeric reactions of the acetoacetic ester type, Friedel-Crafts catalysts, for example $AlCl_3$, $SbCl_5$, $SnCl_4$, $ZnCl_2$, $BF_3$ and their complexes with organic compounds, for example $BF_3$-amine complexes; metal fluoroborates such as zinc fluoroborate; phosphoric acid; boroxines such as trimethoxyboroxine.

Preferred curing agents are polybasic carboxylic acids and their anhydrides, for example the following anhydrides: phthalic, tetrahydrophthalic, hexahydrophthalic, methylhexahydrophthalic, endomethylene - tetrahydrophthalic, methylendomethylene - tetrahydrophthalic (=methyl nadic anhydride), hexachloro-endomethylene-tetrahydrophthalic, succinic, adipic, maleic, allylsuccinic, dodecenylsuccinic; 7-allylbicyclo(2,2,1)hept - 5 - ene-2,3-dicarboxylic anhydride, pyromellitic dianhydride or mixtures of such anhydrides. Preferred curing agents are those which are liquid at room temperature.

If desired, there may be additionally used accelerators, such as tertiary amines, their salts or quaternary ammonium compounds, for example tris(dimethylaminomethyl)phenol, benzylidimethylamine benzyldimethylammonium phenolate, tin(II) salts of carboxylic acids, such as tin(II) octoate or alkali metal alcoholates, for example sodium hexylate.

For curing the polyepoxides of this invention with anhydrides it is advantageous to use for every gram equivalent of epoxide groups 0.5 to 1.1 gram equivalents of anhydride groups.

Optimal properties of the cured products are achieved as a rule by using 0.85 equivalent of anhydride groups for every equivalent of epoxide groups. However, when an accelerator containing hydroxyl groups is additionally used, it is advantageous to increase the amount of anhydride curing agent added.

The term "curing" as used in this context signifies the conversion of the above diepoxides into insoluble and infusible, crosslinked products, in fact generally with simultaneous shaping to furnish shaped articles such as castings, mouldings or laminates or flat structures, such a lacquer films or adhesive bonds.

Accordingly, the present invention provides also curable mixtures containing the diepoxides of this invention, if desired in admixture with other diepoxides or polyepoxides, and also with curing agents for epoxy resins such as polyamines or dicarboxylic acid anhydrides.

The diepoxy compounds of this invention and their mixtures with other polyepoxy compounds and/or curing agents may be admixed at any stage prior to the curing operation with fillers, plasticizers, pigments, dyestuffs, flame-inhibitors or mould releasing agents.

Suitable extenders and fillers are, for example, asphalt, bitumen, glass fibres, cellulose, mica, quartz meal, hydrated aluminium oxide, gypsum, kaolin, ground dolomite, colloidal silica having a large specific surface (Aerosil) or metal powders, such as aluminum powder.

The curable mixtures may be used in the unfilled or filled state, if desired in the form of solutions or emulsions, as textile assistants, coating compositions, paints, lacquers, dipping or casting resins, putties or sealing compositions, potting or insulating compositons for the electrical industry, adhesives and also for the manufacture of such products. The new products are preferably used in applications in which increased elasticity of the cured materials is of importance.

Parts and percentages in the following examples are by weight. The relationship between parts by weight and parts by volume is the same as that between the kilogram and the litre.

EXAMPLE 1

Diglycidylpolyether A 1180 parts of hexanediol-1,6 and 23.6 parts of p-toluenesulphonic acid are melted in a 4-necked flask equipped with agitator, thermometer, gas inlet tube, Vigreux column with descending condenser and a calibrated receptacle.

Hexanediol-1,6 melts at 42° C. The mixture is heated while being stirred and passing nitrogen. At an internal temperature of 170 to 175° C. water and cyclohexamethylene oxide begin to pass over. After 2 hours and 50 minutes 90 parts by volume of water and 64 parts by volume of cyclic ether have passed over. The temperature is 184° C. The batch is cooled to 80° C., 2 parts by volume of tin tetrachloride are added and while supplying slight external cooling, 925 parts of epichlorohydrin are dropped in. When the exothermic reaction has subsided, another 2 parts by volume of tin tetrachloride, another 1 part by volume after 18 hours and a further 1 part by volume after 21 hours at 80° C. are added. After 24 hours at 80° C. the epoxide content has dropped to 0.063 equivalent per kg. The reaction mixture is dissolved in 500 parts by volume of toluene and while cooling externally, 440 parts of powdered caustic soda are added portionwise at a rate such that the temperature of the reaction mixture remains at 20 to 25° C. Then another 200 parts by volume of toluene are added, the whole is heated to 50° C. and this temperature is maintained for 2 hours while stirring. The batch is then cooled to 20–25° C., the precipitated sodium chloride is filtered off and the solvent is distilled off under vacuum, during which the batch temperature is raised to 120° C. under 15 mm. Hg pressure. These conditions are maintained for another 30 minutes to remove the last traces of solvent. The turbid residue is clarified by filtering it still hot through a silica filter assistant.

After cooling, there are obtained 1,298 parts of diglycidylhydroxyhexylether (=78.6% of the theoretical yield, referred to hexanediol-1,6) as a yellow oil which reveals the following characteristic values:

Epoxide content _____equivalents/kg__ 4.66
Chlorine _____percent__ 2.07
Molecular weight _____ 335
Viscosity at 20° C. _____centipoises__ 58
Colour number (G. and H.) _____ 4

EXAMPLE 2

Diglycidylpolyether B

While stirring and passing nitrogen a mixture of 1180 parts of hexanediol-1,6 and 23.6 parts of p-toluenesulphonic acid is heated at 180–200° C. until 144 parts by volume of water and 120 parts by volume of cyclohexamethylene oxide have passed over. The residue is cooled to 80° C. and 2.5 parts by volume of tin tetrachloride are added. Then 370 parts of epichlorohydrin are dropped in at 80° C. and the batch is allowed to react further overnight at 80° C., then cooled to room temperature, diluted with 800 parts by volume of toluene. While cooling externally, 176 parts of powdered sodium hydroxide are added and the whole is allowed to react further for 90 minutes at 50° C., then diluted with a further 300 parts by volume of toluene and the sodium chloride formed is washed out with 1,000 parts by volume of warm water. The phase separation can be facilitated by adding 2 parts of Turkey red oil. The phases are separated, the toluene solution dried over sodium sulphate, the latter is filtered off, and the toluene is distilled off under vacuum. Yield: about 1,052 parts of diglycidylether of tetra(hexamethylene)-glycol as a low-melting wax having the following properties:

Epoxide content _____equivalents/kg__ 2.86
Chlorine _____percent__ 1.55
Molecular weight _____ 517
Solidification point _____° C__ 32
Colour number (G. and H.) _____ 3–4

EXAMPLE 3

Diglycidylpolyether C 1,180 parts of hexanediol-1,6 and 23.6 parts of p-toluene-sulphonic acid are heated while being stirred and passing nitrogen. After 8 hours at 200 to 210° C., 170 parts by volume of water and 141 parts by volume of cyclohexamethylene oxide have passed over. The batch is cooled to 80° C., 1.5 parts by volume of tin tetrachloride are added and 185 parts of epichlorohydrin are dropped in. The batch is allowed to react for another 5 hours at 80° C., then cooled to 20° C., diluted with 500 parts by volume of toluene and 88 parts of powdered sodium hydroxide are strewn in portionwise. The mixture is diluted with another 200 parts by volume of toluene, allowed to react further for 90 minutes at 50° C., mixed with 750 parts of water and neutralized. The layers are separated, dried over sodium sulphate and the solvent is evaporated under vacuum.

Yield: 875 parts of the waxy diglycidylether of polyhexamethyleneglycol which reveals the following characteristic data:

Epoxide content _____equivalents/kg__ 1.04
Chlorine _____percent__ 0.54
Molecular weight _____ 1840
Solidification point _____° C__ 41
Colour number of melt _____ 7

EXAMPLE 4

Diglycidylpolyether D

A mixture of 136 parts of pentaerythritol, 944 parts of hexanediol-1,6 and 10.7 parts of p-toluenesulphonic acid is heated to 190–210° C. while stirring and passing nitrogen. After 5 hours 144 parts by volume of water and 206 parts by volume of cyclohexamethylene oxide have passed over. The batch is cooled to 100° C., 2 parts by volume of tin tetrachloride are added, and 370 parts of epichlorohydrin are dropped in at this temperature. After 2 hours another 2 parts by volume of tin tetrachloride are added, the whole is allowed to react for another 18 hours at 100° C., then cooled to 35° C. and at this temperature 200 g. of powdered sodium hydroxide are added in portions. The batch is taken up in toluene, neutralized with 25% sulphuric acid, the layers are separated and the toluene layer is dehydrated by azeotropic distillation, filtered through a silica filter assistant and the toluene is distilled off under 15 mm. Hg pressure.

As residue there are obtained 958 parts of glycidylether as a yellow oil which contains 2.23 epoxide equivalent per kg.

EXAMPLES 5–33

Specimens of the diglycidylethers A, B and C obtained by the present process and of the known diglycidylether of polybutyleneglycol—if desired in admixture with a conventional epoxy resin—are gelled with known curing agents for epoxy resins and then cured. The castings thus obtained revealed the properties shown in the following tables.

The experiments were carried out with the new diglycidylethers A to D described above and with the control substances F and G, which belong to the known art, with the curing agents mentioned below:

Resin E is a liquid condensation product from bisphenol A and excess epichlorohydrin, manufactured in the presence of alkali. It contains 5.2 epoxide equivalents per kg.

Resin F is a diglycidylether of a polybutyleneglycol manufactured in the following manner:

500 parts of polybutyleneglycol (molecular weight 620; OH number 181) are reacted with 185 parts of epichlorohydrin in the presence of 1 part by volume of tin tetrachloride at 80° C. until epoxide can no longer be identified. The batch is then dehydrohalogenated with 88 parts of sodium hydroxide at 25° C. and allowed to react further for 2 hours at 50° C., then mixed with toluene, neutralized, the sodium chloride formed is washed out, the toluene solution dried and the toluene is distilled off, to yield 628 parts of diglycidylether as a colourless liquid containing 2.38 epoxide equivalents per kg. and 2.0% of chlorine and having a molecular weight of 730.

Resin G is a diglycidylether of a polybutyleneglycol (molecular weight 980) prepared as described above, containing 1.47 epoxide equivalents per kg. and 1.15% of chlorine and having a molecular weight of 1,090.

Curing agent H is hexahydrophthalic anhydride.
Curing agent J is 4,4'-diaminodiphenylmethane.
Curing agent K is triethylenetetramine.

The tensile strength is measured according to DIN 53,455. In this test also the elongation on rupture in percent, referred to the initial length, is measured. The water absorption is determined by the weight increase of test bars (60 x 10 x 5 mm.$^3$) after one hour's boiling in distilled water.

TABLE 1.—TESTING THE RESINS A, B AND C, IF DESIRED TOGETHER WITH RESIN E

| Ex. No.: | Parts of resin | Parts of curing agent | Pregelling Hours | Pregelling °C. | Curing Hours | Curing At °C. | Tensile strength, kg./mm.² | Elongation on rupture, percent | Water absorption in percent |
|---|---|---|---|---|---|---|---|---|---|
| 5 | 100A | 61H | 4 | 100 | 20 | 140 | 0.09 | 13.8 | 1.86 |
| 6 | 75A, 25E | 63H | 4 | 100 | 20 | 140 | 0.98 | 90.0 | 1.11 |
| 7 | 50A, 50E | 64.5H | 4 | 100 | 20 | 140 | 5.65 | 4.5 | 0.83 |
| 8 | 50A, 50E | 12K | | | 24 | 40 | 1.37 | 27.1 | 2.66 |
| 9 | 75A, 25E | 23.5J | 1 | 80 | 2 | 120 | 0.39 | 63.9 | 1.81 |
| 10 | 100B | 37.5H | 4 | 100 | 20 | 140 | 0.04 | 15.4 | |
| 11 | 100B | 14J | 1 | 80 | 3 | 120 | 0.08 | 30.5 | |
| 12 | 50B, 50E | 52.5H | 4 | 100 | 20 | 120 | 1.5 | 55.6 | 0.94 |
| 13 | 50C, 50E | 41.0H | 4 | 100 | 20 | 120 | 0.51 | 90.2 | 1.30 |
| 14 | 100D | 44J | 2 | 80 | 2 | 120 | 0.50 | 15.0 | 1.29 |
| 15 | 75D, 25E | 57.6J | 2 | 80 | 2 | 120 | 0.37 | 44.0 | 1.23 |

TABLE 2.—COMPARATIVE TESTS WITH RESIN F

| Ex. No.: | Composition of epoxy resin, percent | Curing agent per epoxide equivalent | Pregelling Hours | Pregelling At °C. | Curing Hours | Curing At °C. | Elongation on rupture in percent | Tensile strength, kg./mm.² | Water absorption in percent |
|---|---|---|---|---|---|---|---|---|---|
| 16 | 100F | 0.85 mol of curing agent H | 4 | 100 | 24 | 140 | (Not totally cured, tacky) | | |
| 17 | 75 F, 25E | | 4 | 100 | 24 | 140 | (Not totally cured, tacky) | | |
| 18 | 50F, 50E | | 4 | 100 | 24 | 140 | 78.7 | 1.02 | 1.14 |
| 19 | 100F | 0.166 mol of curing agent K | | | 25 | 12 | 40 (Mechanically of inferior quality) | | |
| 20 | 75F, 25 E | | | | 25 | 24 | 40 | 12.2 | 0.03 | |
| 21 | 50F, 50E | | | | 25 | 24 | 40 | 3.55 | 1.0 | 1.92 |
| 22 | 100F | 0.25 mol of curing agent J | 1 | 80 | 2 | 120 | (Mechanically of inferior quality) | | |
| 23 | 75F, 25E | | 1 | 80 | 2 | 120 | 29.1 | 0.08 | 1.46 |
| 24 | 50F | | 1 | 80 | 2 | 120 | 65.1 | 0.95 | 1.19 |

TABLE 3.—COMPARATIVE TESTS WITH RESIN G

| Ex. No.: | Composition of epoxy resin, percent | Curing agent per epoxide equivalent | Pregelling Hours | Pregelling At °C. | Curing Hours | Curing At °C. | Elongation on rupture in percent | Tensile strength, kg./mm.² | Water absorption in percent |
|---|---|---|---|---|---|---|---|---|---|
| 25 | 100G | 0.85 mol of curing agent H | 4 | 100 | 20 | 140 | (All specimens tested insufficiently; cured and tacky) | | |
| 26 | 75G, 25E | | 4 | 100 | 20 | 140 | | | |
| 27 | 50G, 50E | | 4 | 100 | 20 | 140 | | | |
| 28 | 100G | 0.166 mol of curing agent K | | | 20 | 40 | (All specimens tested not gelled and not curable) | | |
| 29 | 75G, 25E | | | | 20 | 40 | | | |
| 30 | 50G, 50E | | | | 20 | 40 | | | |
| 31 | 100G | 0.25 mol of curing agent J | 1 | 80 | 27 | 120 | (Not curable) | | |
| 32 | 75F, 25E | | 1 | 80 | 2 | 120 | (Mechanically of inferior quality) | | |
| 33 | 50F, 50E | | 1 | 80 | 2 | 120 | | | |

I claim:
1. A polyepoxide selected from the group consisting of a compound of the formula

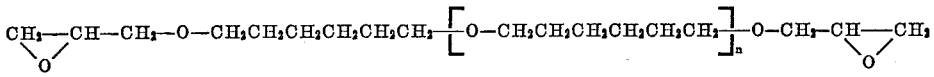

and a compound of the formula

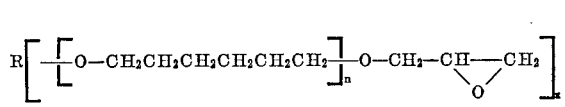

wherein R is the hydrocarbon residue of an aliphatic saturated polyhydric alcohol with 2 to 4 hydroxyl groups from which the hydroxyl groups have been removed, n is an integer of at least 1 and at most 100 and z is an integer of at least 2 and at most 4.

2. A polyglycidyl ether as claimed in claim 1 which is the diglycidyl ether of di(hexamethylene)-glycol.
3. A polyglycidyl ether as claimed in claim 1 which is the diglycidyl ether of tetra(hexamethylene)-glycol.
4. A polyglycidyl ether as claimed in claim 1 which is the diglycidyl ether of a polyhexamethylene glycol of average molecular weight 1,000 to 2,000.
5. A polyglycidyl ether as claimed in claim 1 which has the formula

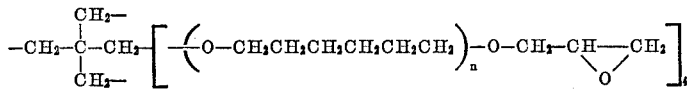

wherein n is an integer of at least 1 and at most 100.

References Cited
UNITED STATES PATENTS
3,096,349    5/1963    Meyer et al. _____ 260—348

HAROLD D. ANDERSON, Primary Examiner

T. PERTILLA, Assistant Examiner